W. HOLLANDS.
APPARATUS FOR PRODUCING TORIC LENSES.
APPLICATION FILED SEPT. 17, 1913.
1,221,858.
Patented Apr. 10, 1917.
2 SHEETS—SHEET 1.
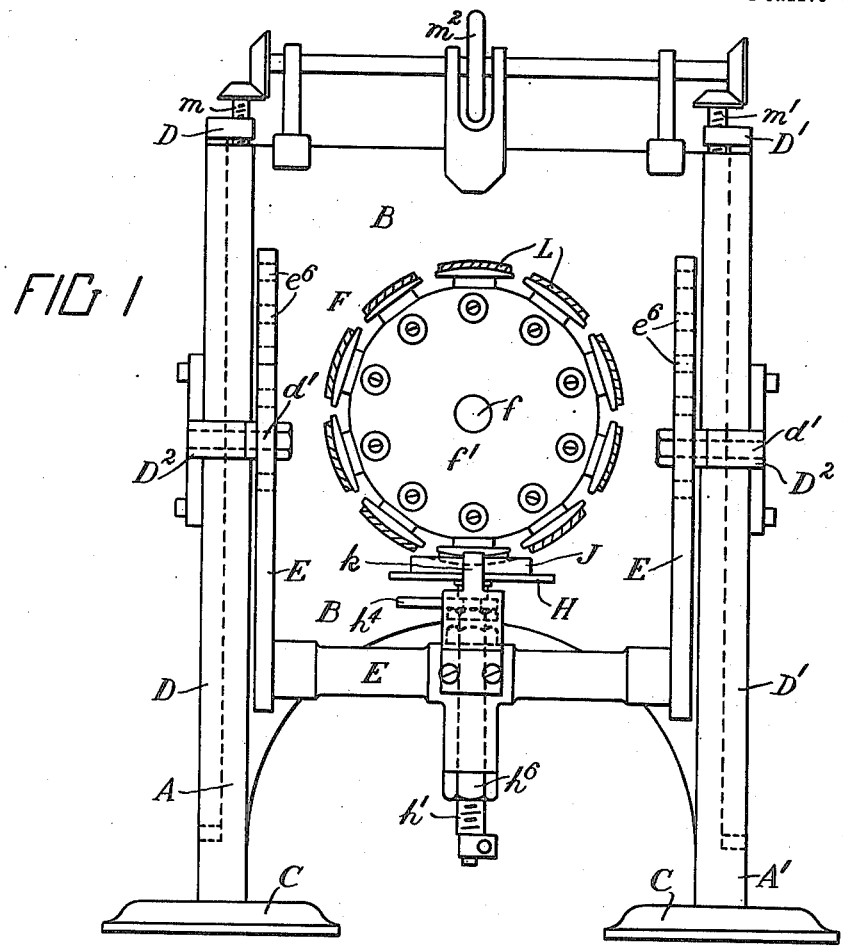
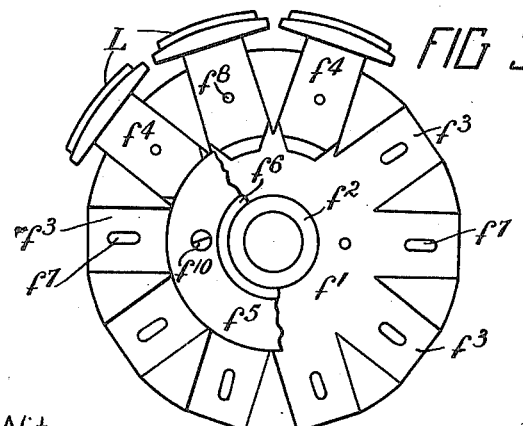
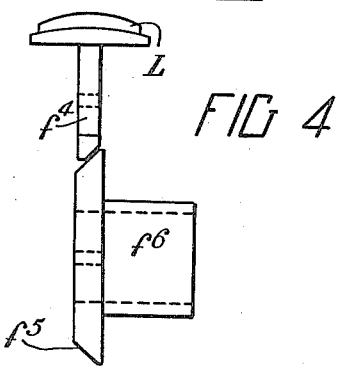
Witnesses.
J. Morrill Fuller
Joseph D. Ashe.
Inventor.
Walter Hollands,
by Heard Smith & Tennant
Atty's.

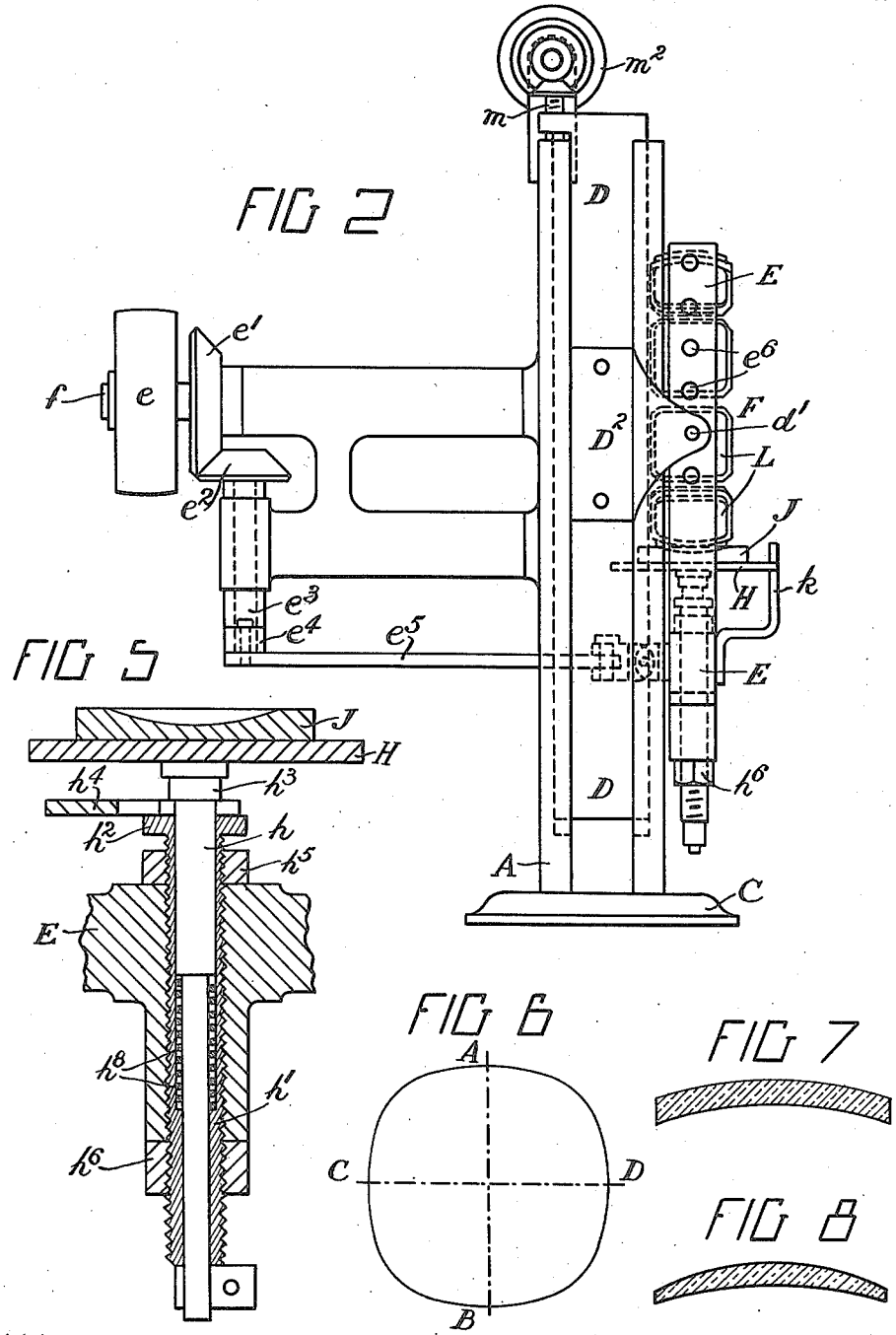

UNITED STATES PATENT OFFICE.

WALTER HOLLANDS, OF LONDON, ENGLAND.

APPARATUS FOR PRODUCING TORIC LENSES.

1,221,858.   Specification of Letters Patent.   Patented Apr. 10, 1917.

Application filed September 17, 1913. Serial No. 790,228.

*To all whom it may concern:*

Be it known that I, WALTER HOLLANDS, a subject of the King of Great Britain and Ireland, residing at Newington Green, London, England, have invented a new and useful Apparatus for Producing Toric Lenses, of which the following is a specification.

This invention has reference to an improved apparatus for producing toric lenses—*i. e.* lenses having on one side at least a surface of double curvature—and which lenses are largely used for spectacles and the like.

The production of toric lenses by grinding and polishing them by hand is a comparatively slow and tedious process requiring the exercise of fairly considerable skill on the part of the workman to insure exactitude in the production of the proper curvatures on the lens. The natural result of this is that lenses so produced are comparatively expensive and the main object of my invention is to enable such lenses to be produced comparatively very cheaply.

Attempts to this end have been made by grinding the lenses in a machine, the lenses, which were fixed on the periphery of a rotating disk, being subjected to a double grinding action viz. a grinding action in the direction of rotation of the disk and a grinding action in directions transverse to the direction of rotation of the disk, the grinding action in the transverse direction being effected by a rapidly rotating grinding tool which was simultaneously made to swing across the plane of the rotating disk and the grinding surface of which rotating tool was spherical.

Although the aforesaid rotating and swinging grinding tool has been made to rock on a center which theoretically ought to result in the production of lenses whose surface in one direction forms an arc having the aforesaid center as its center, in practice this can not be attained the actual curve being always quite different.

My invention consists in a machine for producing toric lenses by grinding, comprising a lens carrier rotating in a circular path, a grinding tool to contact with the lens as the latter is rotated, a carrier to support the grinding tool fixedly, said means to support the carrier to permit the latter to be swung in an arc of a circle across the path of movement of the lens, and it also comprises the combination with a rotatable lens carrier having provision for supporting lenses for movement in a circular path, of a non-rotatable tool carrier pivotally mounted to swing about an axis extending at right angles to that of the lens carrier, a tool fixedly supported by the tool carrier in position to engage the lens on the lens carrier, and means for oscillating the tool carrier in such timed relation with the rotation of the lens carrier that movement of the tool across the path of movement of the lens on the lens carrier is varied for successive rotations of the lens carrier.

I have found as the result of experiments that the best results are attained if the grinding properly so called be effected with the grinding tool held firmly and unyieldingly to its work but when the polishing and finishing stages are reached the polishing or finishing material should press with a more or less soft and yielding pressure and to this end my invention comprehends means whereby when the initial grinding has been effected the grinding tool may be made to press with a yielding pressure.

My invention further also comprehends certain details of construction to be referred to hereinafter.

A constructional form of my invention, given merely by way of example, is illustrated in the accompanying drawings in which:—

Figure 1 is a front elevation, and

Fig. 2 a side elevation of the complete machine,

Fig. 3 is a view from the back of one form of lens carrying disk, parts being broken away to enable others to be clearly seen, Fig. 4 shows details thereof in side elevation, Fig. 5 is a sectional view on an enlarged scale of the grinding tool and its supporting parts, and Figs. 6, 7 and 8 are a plan and cross section on an enlarged scale of one of the lenses.

In the example illustrated A, A' are standards connected by a plate or web B and having flanges or feet C, the whole forming the framing on which the working parts are carried, the flanges or feet C being adapted to be fixed down on a bench or table as may be desirable.

Adapted to slide in vertical grooves in the standards A, A' are slides D, D' to which brackets D², D² are fixed, the said brackets having trunnion pins or the like $d$, $d'$ on which a saddle E is swingingly mounted. Centrally between said pins $d$, $d'$ and mounted on a shaft $f$ is a lens carrying disk F which may be a solid disk but which in the example illustrated is made to be expansible to enable its effective diameter to be varied, and for this purpose comprises a plate $f'$ formed with a boss $f^2$ and with radial grooves $f^3$ in which slide-pieces $f^4$ slidably fit, the outer ends of which slide-pieces are formed with properly shaped heads on which the lens blanks L are to be attached in the usual manner in which lenses are temporarily secured and the inner ends of which slide-pieces are made taper and all these engaged against a correspondingly tapered edge, formed on the periphery of a circular plate $f^5$ secured to the plate $f^1$ by screws $f^{10}$ and having a sleeve like extension $f^6$ which fits on the boss $f^2$ to thereby hold the plate $f^5$ and its tapered edge central of the plate $f^1$.

The slide-pieces are secured to the plate $f^1$ by screws $f^8$ which are passed through slots $f^7$ in the grooves $f^3$ to permit radial adjustment and it will be seen that by loosening the screws $f^8$ and tightening up the screws $f^{10}$ the slide-pieces $f^4$ may be wedged radially outward or they may be otherwise adjusted and thereafter the screws $f^{10}$ and $f^8$ tightened up. By this means the effective diameter of the disk F may be increased or decreased so that a correspondingly different curvature will have been produced on the lens when the latter has been ground.

Centrally below the disk F and carried by the saddle E is a table H on which the grinding tool J is removably fixed. The table has a spindle $h$ which slidably passes through a screwed tube $h'$ the upper end of which has a flange $h^2$ between which and a flange or collar $h^3$ on the spindle $h$ I place a distance piece $h^4$ which is made to straddle the spindle $h$ and which may be removed for the purpose to be described. By loosening set nuts $h^5$, $h^6$, and rotating the screwed tube $h'$ the vertical position of the table and consequently of the grinding tool may be changed and this is the means whereby, in the example illustrated of my invention, the rough or approximate adjustment of the grinding tool J relatively to the lenses L on the disk F is to be effected. After this the set nuts are again tightened up.

In order to absolutely prevent the slightest rotary movement of the grinding tool J while permitting vertical movement as described I provide a guide piece $k$ which I fix to the saddle E and which enters a groove in the edge of the table H.

The shaft $f$ has mounted on it a belt pulley $e$ or equivalent whereby rotary motion is to be imparted to the disk F and on said shaft I mount a spur wheel $e'$ gearing with which is a spur wheel $e^2$ on a vertical spindle $e^3$ to the lower end of which a crank $e^4$ is fixed which crank is pivotally connected by a rod $e^5$ to the rear of the saddle E about as shown so that as the disk F is rotated the grinding tool J will be rocked across the plane of said disk in its movement describing an arc of a circle having the axis of the pins $d$, $d'$ as its center.

As has already been stated the grinding tool J does not rotate and in starting the machine said tool may consist of a flat plate of metal or other suitable material to which the usual grinding or abrading material is supplied. After a time the plate will be ground down and the hollow or concavity formed in the surface of the plate will have a shape forming the usual counterpart to the convex curvature of the lenses and it is this form of grinding tool which is best adapted to properly effect the grinding of the lenses.

When the machine is at work the grinding tool may be fed up to the work i. e. the lenses by feed screws $m$, $m'$ the turning of which in one direction will raise the plates or slides D, D' and with them the brackets D², trunnions $d$, $d'$, saddle E, table H and grinding tool J and to insure that both sides shall be raised equally I may gear the screws $m$, $m'$ together by bevel or spur wheels so that the rotation of a central disk $m^2$ will raise or lower both slides D, D' to an equal extent, it being understood that the connections for the rod $e^5$ are such as to admit of such adjustment.

When the grinding has been effected and the lenses are to be polished it is advantageous, as already pointed out that the grinding tool J press with a cushioned or yielding pressure and to attain this I provide a coil spring $h^8$ one end of which acts against a shoulder in the screwed tube and the other against a shoulder on the spindle $h$ of the table H and by removing the distance piece $h^4$ the table H and grinding tool J will be held up with a yielding pressure the pressure depending upon the force of the spring $h^8$.

Inasmuch as the rocking of the grinding tool across the rotating lenses is effected by gearing such as $e^2$ and $e'$ it is of some importance to insure that the path of movement of the tool J across the path of movement of the lenses is varied for successive rotations of the lenses otherwise the grinding may not be effected quite regularly over all the lenses (although this risk is minimized if not eliminated altogether by using a tool having the curvature of the lenses) and to this end I may make the gear wheels $e^1$, $e^2$ with numbers of teeth (for example 37 and 15 respectively) which will require a large number of revolutions of said wheels before the teeth again engage as at the start and consequently the lenses will make a correspondingly large number of rotations before the grinding tool crosses in the same path.

The coarse adjustment of the grinding tool is effected as described by adjusting the tube $h^1$ in the saddle E and the fine adjustment by rotating the disk or wheel $m^2$. But in order to adapt the machine for use with a wide range of differently sized disks F I make the saddle E with comparatively long arms in which a number of apertures $e^6$ are formed so that the table and grinding tool may be set higher up or lower down by merely removing the trunnion pins $d, d'$ adjusting the saddle piece and again returning said pins, as will be readily understood from Fig. 1.

Fig. 6 is a plan view of a lens which after having been ground may be made to have a curvature in the direction A, B, as shown in Fig. 7 and a curvature in the direction C, D as shown in Fig. 8 and all the lenses (in the illustrated example Fig. 1 there are 10) fixed to the disk will have exactly the same curvatures. Should lenses of a different curvature be required it will be necessary to make adjustments of (a) the position of the trunnions $d, d'$ relatively to the axis of the shaft $f$ or (b) the diameter of the disk F or (c) the saddle piece E relatively to the trunnions $d, d'$ and the disk F or any two or more of these according to the particular curvatures required.

It will be obvious that it may be of advantage after grinding one set of lenses to employ a new grinding tool, if the next set is to have a different curvature, rather than allow the tool to be ground to the proper shape. Further it will be understood that my invention is equally adapted for producing concave lenses of double curvature as for producing the convex lenses described.

What I claim as my invention and desire to secure by Letters Patent is:—

1. In a machine for producing toric lenses, the combination with a rotatable lens carrier having provision for supporting lenses for movement in a circular path, of a non-rotatable tool carrier pivotally mounted to swing about an axis extending at right angles to that of the lens carrier, a tool fixedly supported by the tool carrier in position to engage the lens on the lens carrier, and means for oscillating the tool carrier in such timed relation with the rotation of the lens carrier that movement of the tool across the path of movement of the lens on the lens carrier is varied for successive rotations of the lens carrier.

2. A machine for producing toric lenses by grinding comprising a lens carrier rotating in a circular path, means to adjust the carrier to thereby change the length of radius of the circular path, a grinding tool to contact with the lens as the latter is rotated, a carrier to fixedly support the grinding tool, means to support the tool carrier to permit it to be swung in an arc of a circle across the path of movement of the lens and means to adjust the tool carrier relatively to its support.

In testimony whereof, I have signed my name to this specification in the presence of two subscribing witnesses.

WALTER HOLLANDS.

Witnesses:
 WILLIAM PARTRIDGE,
 EDWARD RICHD. HOLLANDS.